Sept. 23, 1958 W. H. DRAKE 2,853,196
SAFETY PIN HANDLING AND STORING DEVICE
Filed Nov. 10, 1954 3 Sheets-Sheet 1
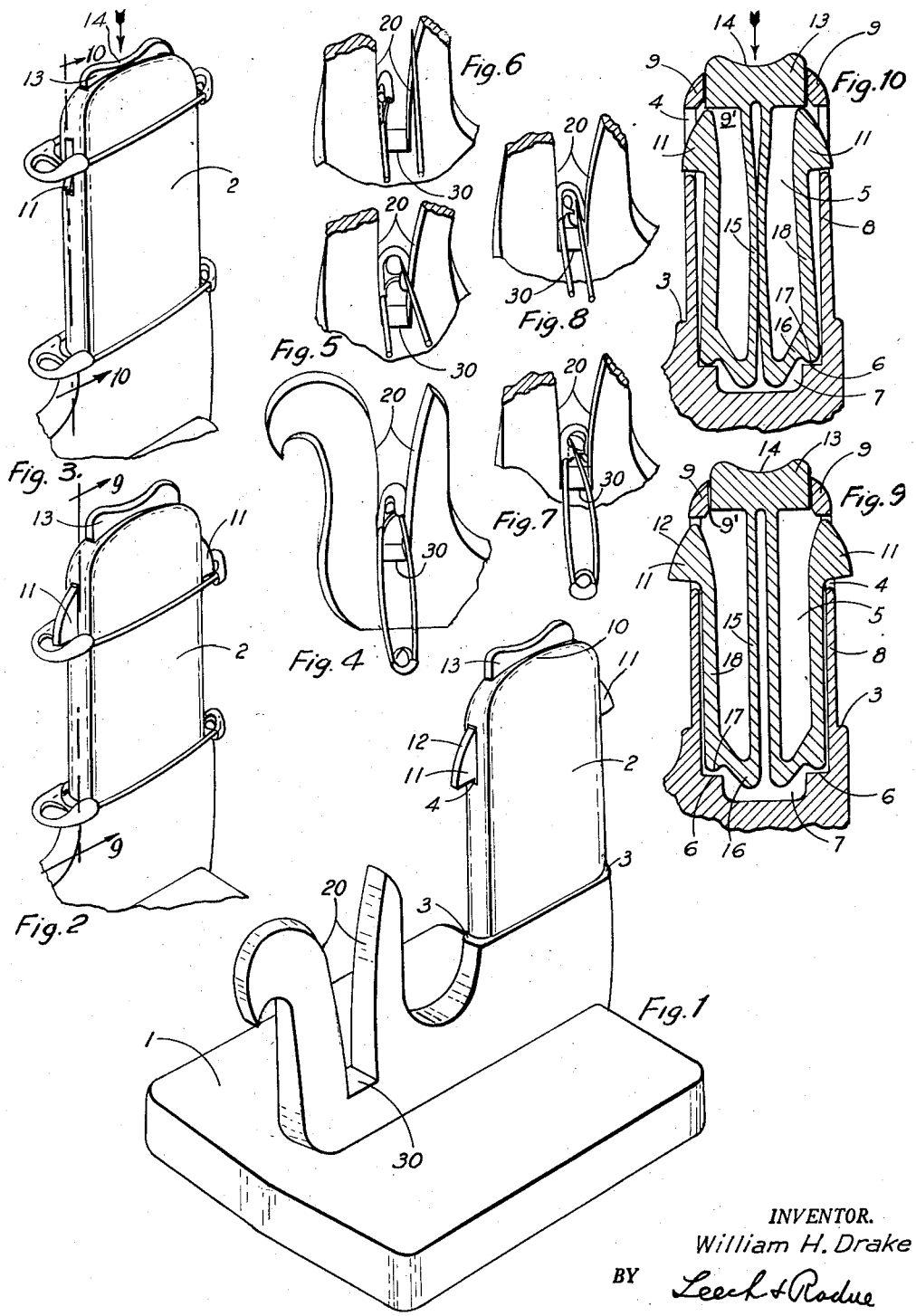
INVENTOR.
William H. Drake
BY Leech & Radue
ATTORNEYS Sept. 23, 1958      W. H. DRAKE      2,853,196
SAFETY PIN HANDLING AND STORING DEVICE Filed Nov. 10, 1954      3 Sheets-Sheet 2

INVENTOR.
William H. Drake
BY Leech & Radue
ATTORNEYS

Sept. 23, 1958 W. H. DRAKE 2,853,196
SAFETY PIN HANDLING AND STORING DEVICE
Filed Nov. 10, 1954 3 Sheets-Sheet 3

INVENTOR.
William H. Drake
BY Leech + Radue
ATTORNEYS

United States Patent Office 2,853,196
Patented Sept. 23, 1958

2,853,196

SAFETY PIN HANDLING AND STORING DEVICE

William H. Drake, Carpinteria, Calif.

Application November 10, 1954, Serial No. 467,985

3 Claims. (Cl. 211—59)

My invention relates to devices that store a safety pin or a plurality of them and assist an operator in opening or closing a safety pin.

The general object of my invention is to provide a safety pin aid that will permit the operator to use only one hand in manipulating a safety pin to open or to closed condition or in moving it into or out of stored position.

Another object of this invention is to provide a device that encourages the habit of closing safety pins after use and of keeping them in one place in a closed condition.

Another object of this invention is to provide a storage place for safety pins to hold them against accidental release or withdrawal by a small child and yet permit an older person to withdraw a pin while using only one hand.

Another object of this invention is to provide control portions between which the shanks of safety pins may be caused to slide to positions of relative compression and skewness with the end result of opening or closing the safety pin.

To make these and other objects understood with particularity, I have illustrated and described several embodiments of this invention. The first sheet of figures illustrates the embodiment preferred for earliest commercialization because it is ready to be used free standing rather than requiring any attachment to a supporting wall or item of furniture. However, the other embodiments shown on later sheets were designed to accomplish the same objects of invention and share a number of characteristics with the preferred embodiment.

In the drawings:

Fig. 1 is an isometric view of the preferred embodiment showing edge-positioned latches on the storage post and a separate piece for the opener-closer slot.

Fig. 2 is a view of the storage post broken away from Fig. 1 and showing one safety pin being blocked from withdrawal by the latches.

Fig. 3 is a view of the storage post broken away from Fig. 1 and showing how downward force on the release button will retract the latches for removal of a safety pin.

Figs. 4 to 8 inclusive are broken away portions of the opener-closer slot looking from a point of view facing the slot and slightly above it. Figs. 4, 5 and 6 show the safety pin in opening sequence. Figs. 6, 5, 7 and 8 show the safety pin in closing sequence.

Fig. 9 is a section taken through the edgewise plane of symmetry of Fig. 2 on the center plane indicated by section lines 9—9.

Fig. 10 is a section taken through the edgewise plane of symmetry of Fig. 3 on the center plane indicated by section lines 10—10.

Figure 11:
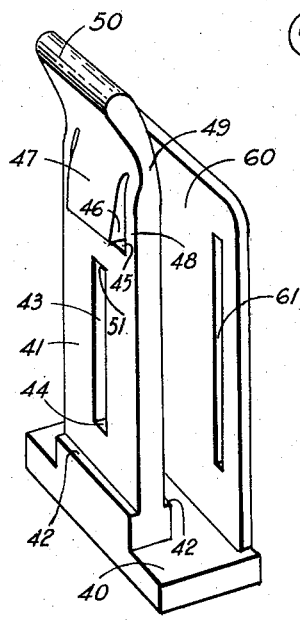

Fig. 11 is a trimetric view of the second embodiment showing a pivotally controlled, thickness-increasing latch on the storage post and an opener-closer slot in the storage post.

Figure 12:
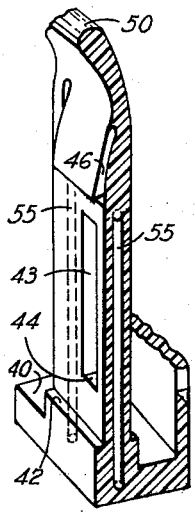

Fig. 12 is a partially broken away portion of the Fig. 11 that has a section cut away to show the positioning of reinforcing rods.

Figure 13:
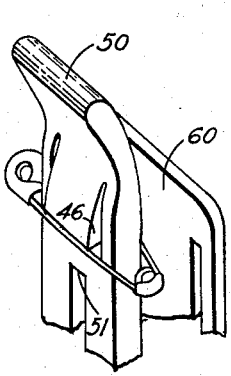

Fig. 13 is a view of top of storage post and back broken away from Fig. 11 showing one safety pin being blocked from withdrawal by the latch.

Figure 14:
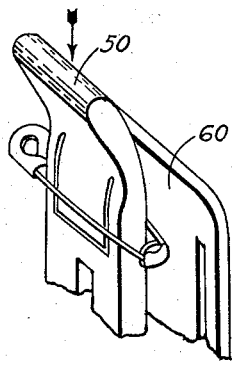

Fig. 14 is a view of the top of storage post and back broken away from Fig. 11 showing how downward pivoting force on the release bar will retract the latch.

Figure 15:
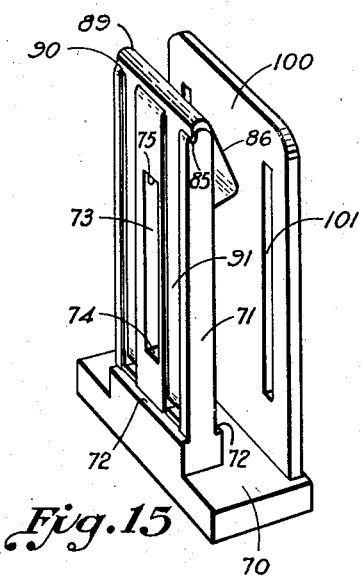

Fig. 15 is a trimetric view of the third embodiment showing a downward controlled, thickness-increasing latch on the storage post and an opener-closer slot in the storage post.

Figures 16, 17:
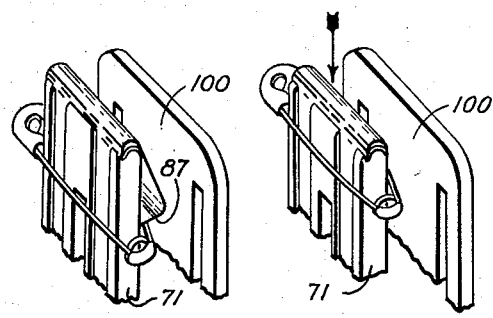

Fig. 16 is a view of the top of storage post and back broken away from Fig. 15 showing one safety pin being blocked from withdrawal by the latch.

Fig. 17 is a view of the top of storage post and back broken away from Fig. 15 showing how downward force on the release plate will retract the latch.

Figures 18, 19, 20:
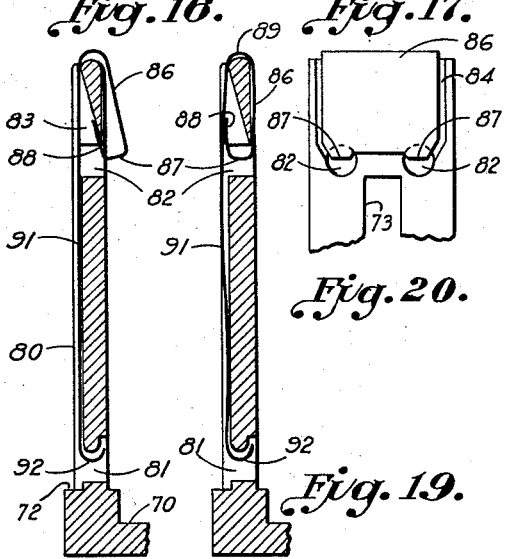

Fig. 18 is a section taken through the storage post of Fig. 15 showing the latch in blocking position.

Fig. 19 is a section taken through the storage post of Fig. 15 showing the latch in retracted position.

Fig. 20 is a back view of the top of the storage post showing receiving holes into which catch tips may be retracted.

Figure 21:
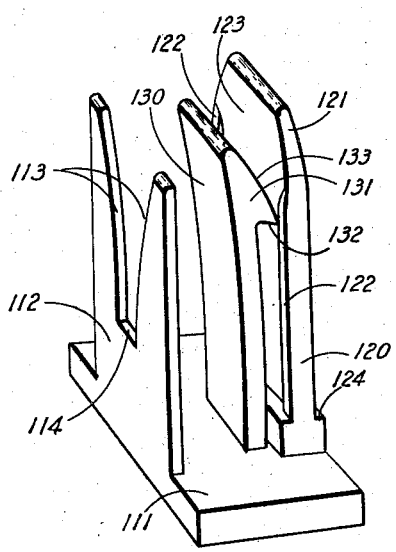

Fig. 21 is a trimetric view of the fourth embodiment showing a laterally controlled, laterally pivoting latching post and a separate piece for the opener-closer slot.

Figure 22:
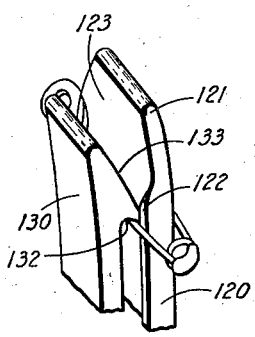

Fig. 22 is a view of the top of latching post and storage post broken away from Fig. 21 showing one safety pin being blocked from withdrawal by the latch.

Figure 23:
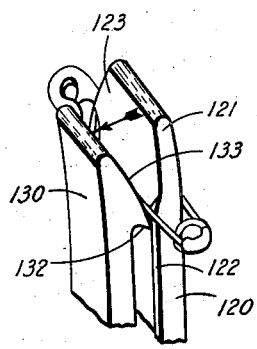

Fig. 23 is a view of the top of latching post and storage post broken away from Fig. 21 showing how lateral force on the release plate will move the latch out of blocking position.

Figure 24:
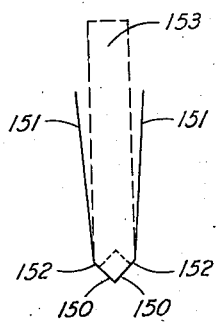

Fig. 24 is a schematic view showing the essential surfaces and clearances of the opener-closer slot.

Figure 25:
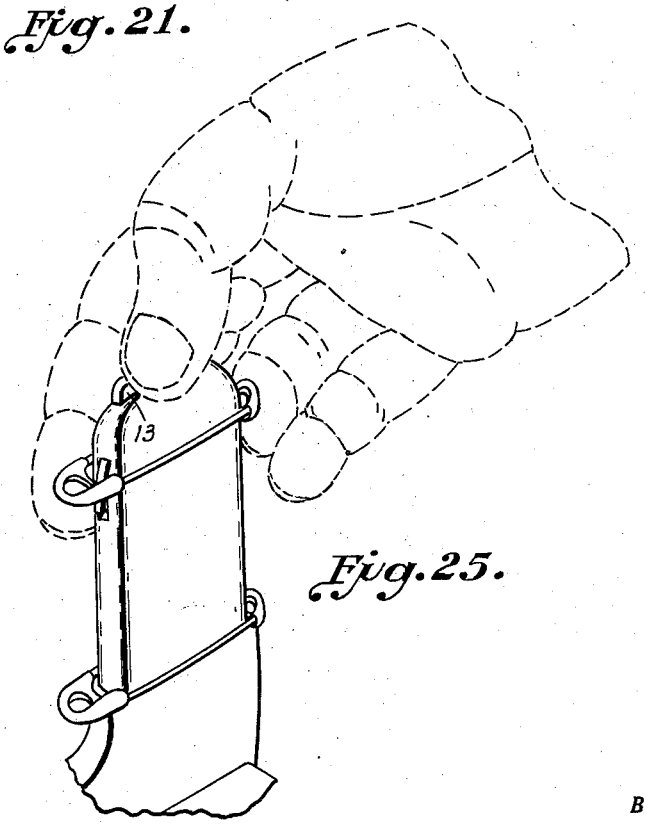

Fig. 25 is a pictorial view of the preferred embodiment showing one technique by which an operator can use only one hand in releasing and removing a safety pin from the storage post.

Referring to Figs. 1 and 9 it can be seen that the first and preferred embodiment of the device consists of a base 1 above which is mounted a storage post 2. This storage post is considerably wider than it is thick in proportions that are limited as will be explained later. At the lower margins of the storage post are shoulders 3 which cause the cross-sectional width of the storage post to be greater than the zone above it. This pair of shoulders facilitates the even stacking of safety pins around the post as is shown in Fig. 2 and make it easier to remove safety pins. There is a pair of side openings 4, one of which is shown in Fig. 1. These openings converge and join a hollow space 5 and clearance space 7, as shown in Fig. 9. Inner space 5 is guarded by boundary wall 8 and foundations 6, which are parts of the storage post. Above the openings 4 are guide portions 9 forming a top opening 9' which also serve to present a tapering zone of increasing width as a safety pin is lowered onto the storage post. The storage post 2 also tapers in regard to thickness in portions 10 for the same reason of guiding a closed safety pin onto the storage post without its catching.

The shape of the cavity formed within the storage post 2 is shown in Figs. 9 and 10 and is of a thickness sufficient to allow the latching mechanism to move freely without excessive play. The latching mechanism is preferably made of uniform thickness of one piece of material and the thickness of the cavities within storage post 2 is therefore indicated by the thickness of a portion of the latching mechanism.

For convenience, the storage post structure in its detail is numbered 2 through 10 and the latching mechanism is numbered in its detail from 11 through 18.

As shown in Figs. 1 through 3, latching mechanism 11 through 18 consists of catches 11 having inclined faces 12 and controlled by release button 13 which has finger conforming cavity 14 at its upper surface. Finger button 13 is joined to bifurcated stems 15 that extend downward from the finger button 13 to elbows 16 which join the lower end of button stems 15 with roll portion 17. Roll portion 17 is designed to act as a fulcrum but from considerations of strength of materials is not constructed as a knife edge. The roll portion rolls and acts as a fulcrum while being supported by foundations 6. It should be noted that in order to assist the natural movements and bending of button stems 15, the ends of button stems 15 are positioned below the surfaces of the foundations 6 and clearance space 7 allows such movement of the elbows. Pivoting arms 18 join the roll portions with the catch pieces 11 and cause their withdrawal when finger button 13 is forced downward as shown in Fig. 10. Latching mechanism 11 through 18 is constructed of material with sufficient flexibility to allow the change of shape exhibited from Fig. 9 to Fig. 10 and yet have sufficient rigidity to form its function as a barrier to undesired withdrawal of the safety pins from the storage post 2.

It can also be seen from a examination of Figs. 9 and 10 that the function of guide portions 9 is to guide the downward movement of finger button or push button 13 as well as to guard contacts with the catch pieces 11 when catch pieces 11 are in retracted position. In other words, the space immediately between guide portions 9 is an aperture in which push button 13 is designed to slide.

Erected on one side of storage post 2 is the structure providing guide surfaces 20 and ledge surface 30 which together outline the important portions of the opener-closer slot as will be described later in detail.

For convenience and simplicity in construction the base, storage post, and opener-closer slot may be formed from two integral halves which provide the hollowed out portions indicated in the storage post. In other words, each integral half contains one-half of a base, one-half of a storage post and one-half of an opener-closer slot. When these pieces are suitably joined together as by cementing, latching mechanism 11 through 18 is bound within the hollow portion of the storage post.

In operation the safety pin aid or device which is the inventive subject matter of this specification is kept at a convenient location and is used to hold a supply of safety pins all of approximately the same size and type. In the case of first embodiment of my invention, safety pins fit around storage post 2, stacked upward above shoulders 3 and are held from being raised off the post by projecting catches 11. For use in a nursery, standard No. 3 safety pins are most likely to be employed. The No. 3 safety pins are large enough to hold diapers in place easily.

To withdraw a safety pin from the stack, the operator places one finger or thumb on the indented portion 14 of release button 13 and presses downward in the direction of the arrow. This pressure causes elbow pieces 16 to pivot on foundations 6 and swing pivoting arms 18 toward each other to retract catches 11 from the position shown in Fig. 9 to that shown in Fig. 10. During this motion, the lower part of elbow piece 16 swings lower into space 7 and the bifurcated button stem bends to accommodate such motion. The fingernail of another finger of the same hand can be used to raise the top safety pin of the stack. This is conveniently in a direction opposing the pressure on the release button. Then one or two fingers can slide under the top safety pin. While still pressing downward on release button 13, the top safety pin is raised past catches 11 and from the storage post as shown in Fig. 25.

When the operator no longer presses on release button 13, the spring tension in bifurcated button stems 15 causes catches 11 to move outward to extended position of Fig. 9. In constructing latching mechanism 11 through 18, it is made to spread pivoting arms farther apart than edge portions 8 will permit. Hence, there is enough spring force in bifurcated button stems 15 when release button 13 is not pressed to cause it to positively move catches 11 to their fully extended position.

To open the withdrawn safety pin only one hand is needed. The safety pin is inserted into the opener-closer slot with the point guard of the safety pin away from the operator.

The safety pin is moved downward to the ledge portions 30 of the opener-closer slot and twisted as shown in Fig. 4. As the twisiting is continued the pointed shank makes glancing contact with the edge 20 of the opener-closer slot and is thereby urged by the reaction of force to displace laterally upward from the plane in which the safety pin is urged open by its own spring tension. This plane will be hereafter called the plane of pin spring tension. At this stage of twisting, in spite of being urged laterally, the pointed shank cannot snap out of the point guard. As twisting continues to an extent somewhat less than 90 degrees from alignment with the plane bifurcating the opener-closer slot, as shown in Fig. 5, the pointed shank moves toward the guard shank sufficiently for the pointed shank to clear the point guard and snap past it to contact the edge 20 of the opener-closer slot. Then the safety pin is twisted back until the safety pin can open completely and align sufficiently with edges 20 of the opener-closer slot to permit easy withdrawal of the safety pin.

The above description of an opening sequence and the figures referred to explain the detailed action that takes place during opening when the pointed shank happens to start uppermost in the opener-closer slot. This twisting of slightly less than a quarter turn and return causes the safety pin to open whether the pointed shank is above or below the guard shank at the beginning of the operation. Furthermore, the action of the safety pin is so similar that there is no difference in manipulation.

To close the safety pin after use, the safety pin is inserted in the opener-closer slot and moved downward against ledge portion 30, as shown in Fig. 6. At the same time the safety pin is given a 180 degree twist to close it. As shown in Fig. 5, this twisting process causes the pointed shank to slide on guide surface 20 and approach the point guard but somewhat displaced from the plane of pin spring tension. As twisting continues the pointed shank moves beyond the rim of the point guard as shown in Fig. 7. Twisting past 90 degrees from the bifurcating plane causes the pointed shank to snap to a position against the shank lobe, which is the portion that extends from the guard shank partially into the point guard. Although the reaction of spring pressure from the safety pin now urges the pointed shank to move to a displaced position on the lower side of the safety pin plane of spring tension, the shank lobe halts such displacement as shown in Fig. 8. By continuous twisting in the same direction the pointed shank is allowed to ride on the shank lobe until the pointed shank snaps inside the point guard. Additional twisting to about 180 degrees aligns the pin substantially with the bifurcating plane of the opener-closed slot and thus permits easy withdrawal.

The above description and the accompanying figures referred to explain the detailed action that takes place during closing when the pointed shank happens to start uppermost in the opener-closer slot. This twisting through a half-turn causes the safety pin to close whether the pointed shank is above or below the guard shank at the beginning of the operation. Furthermore, the action of the safety pin is so similar that there is no difference in manipulation.

To place a closed safety pin on storage post 2 the safety pin is pushed down over as guided by guide portions 9 and tapered positions 10. As the safety pin contacts catches 11 it reacts with the beveled portions 12 to cause catches 11 to retract far enough to permit the safety pin to move down on top of shoulders 3 or on top of other safety pins already stacked there. After the safety pin passes downward past catches 11 the spring action of bifurcated button stems 15 which has allowed retraction of catches 11 returns catches 11 to their extended position as shown in Fig. 9.

Although safety pin manipulation for standard safety pins has been described to illustrate method of operation, this safety pin device will operate for opening or closing safety pins of the plastic head type such as disclosed in U. S. patents numbered 2,351,569 and 2,551,063. A somewhat different twisting motion is required for each of the plastic head safety pins during the opening and closing manipulations using the devices that are the inventive subject matter of this specification.

A second embodiment of my invention, shown in Fig. 11, consists of a base 40 surmounted by a vertically disposed storage post 41 having shoulders 42 near its lower end. There is formed in storage post 41 an opener-closer slot consisting of vertical guiding edges 43, ledge portion 44 at their lower end, and a top portion 51 at their upper end. An opening 45 above the opener-closer slot contains the nose piece 46 which normally projects angularly from one surface of the storage post. In its normally projecting position the nose piece 46 has a control edge 47 which acts as a cam to retract nose piece 46 when a safety pin is lowered over storage post 41. Flanking nose piece 46 and separated from it by a part of the opening 45 are support portions 48 which carry the thinner bending portions 49. Portions 48 and 49 act as supports and fulcrum zones for the release bar 50 which is rigidly connected to nose piece 46 but which is bendably connected through bending portions 49 to support pieces 48.

Also joined to base 40 and extending upward therefrom is back 60 in which are formed two attachment slits 61 which facilitate fastening the back of this device to a vertical surface such as a wall or the vertical side of a piece of furniture. Alternatively a tape of some adhesive type may be placed across the back 60 and join it thereby with some vertical surfaced object. Preferably the storage post 41 is made of some flexible material such as polyethylene or rubber and for that reason is stiffened for the lower portion of its length by ribs 55 as shown in Fig. 12.

A safety pin on the storage post 41 is normally blocked from withdrawal by the normally extending position of nose piece 46 which extends across the path of withdrawal of one of the safety pin shanks as shown in Fig. 13. Nose piece 46 serves as a latch. However, as shown in Fig. 14 when force is applied more or less in the direction of the arrow, nose piece 46 is pivoted to a position completely faired into the opening 45 near the top of the storage post and the safety pin may be pulled upward at the same time with other fingers of the same hand. This pivoting action of nose piece 46 takes place because of the comparatively greater flexibility of the bending portions 49.

When the safety pin has been completely withdrawn from the vertical portion of the storage post occupied by nose piece 46 the spring action of bending portions 49 returns the nose piece to its normally extended position as shown in Fig. 13. The operation of the embodiment shown in Figs. 11 through 14 is very similar to the operation of the embodiment illustrated in the previous figures. The movement of release bar 50 is downward but is pivoting downward rather than moving straight downward as is the case with the device illustrated in Figs. 1 through 10. However, the application of force by one finger is in the same direction.

A third embodiment of my invention, shown in Fig. 15, includes a base 70 from which vertically extends a storage post 71 having shoulders 72 near its lower end. There is formed in storage post 71 an opener-closer slot consisting of vertical guiding edges 73, ledge portion 74 at their lower end, and top portion 75 at their upper end.

As shown in Figs. 15, 18, 19 and 20, storage post 71 has vertical spring grooves 80 on its front extending on each side of opener-closer slot 73 to 75. Grooves 80 join hook holes 81, prong holes 82, and anchor space 83. Prong holes 82 join latch recess 84 on the back side of storage post 71. Storage post 71 has transverse support notches 85 extending across its top end and aligned with grooves 80 and each other.

Latching mechanism 86 through 92 is preferably made of a strip of thin flexible and spring material such as 0.01" thick Phosphor bronze. As shown in Figs. 15, 18, 19 and 20, latching mechanism 86 through 92 includes latch plate 86 at the lower edge of which are formed in-turning prongs 87. Prongs 87 have anchors 88 formed on their ends. Formed at the upper end of latch plate 86 is a doubled back portion 89 in part terminating in support edges 90 which rest in notch 85. Extending downward from doubled back portion 89 are spring links 91 terminating in spring hooks 92.

Latch plate 86 can be seen to recess into latch recess 84 in Fig. 19 while prongs 87 recess into prong holes 82 and anchors 88 pivot from the back to the front of anchor space 83. Spring links 91 extend along grooves 80 to hook holes 81 where spring hooks 92 hold latch mechanism 86 through 92 in place.

As shown in Fig. 16, a safety pin on storage post 71 is normally blocked by prongs 87 from withdrawal. When force is applied to the doubled back portion 89 as shown in Fig. 17, pivoting takes place around support edges 90 and causes latch plate 86 and prongs 87 to be retracted so as to release the safety pin.

Joined to the rear of base 70 and extending vertically above it is back 100 having formed in it two attachment slits 101.

A fourth embodiment, shown in Fig. 21, includes a base 111 above which is joined a vertical fin 112 having generally vertical guiding edges 113 and ledge portion 114 which together form an opener-closer slot.

At the rear of base 111 is attached a vertically extending storage post 120 tapering as to both width and thickness at top portion 121 and having edge guides 122 which form a recess 123. Near the bottom of storage post 120 are shoulders 124 which facilitate removal of the last safety pin in a stack.

In front of storage post 120 is latching post 130 made of suitably flexible material and vertically attached to base 111. Latching post 130 carries catch 131 which has blocking face 132 and tapered face 133. As shown in Fig. 22, catch 131 normally fits partly into recess 123 so that blocking face 132 extends completely across the path of withdrawal of one of the shanks of any safety pin stored on storage post 120.

As shown in Fig. 23, finger pressure or thumb pressure in the direction of the arrow will retract catch 131 from blocking position so that a safety pin may be withdrawn. Also by pressing a safety pin down around storage post 120, one safety pin shank will glance against tapered face 133 and give a resultant of force to retract catch 131 and allow the safety pin to be moved down to the storage zone of storage post 120.

Operation of the several modifications is similar to that of the principal embodiment of my invention, each providing an opener-closer slot and a storage post with latching mechanism. Therefore operation of each modification can be understood from the description of operation following the first and principal embodiment.

The opener-closer slot can be analyzed into several parts as shown in Fig. 24, to aid description of several relationships. The opener-closer slot, generalized to represent any embodiment of my invention, consists of a slot bottom 150 having a divergence from each other of greater than 90 degrees, working slot slides 151 having a divergence of less than 20 degrees from each other, and ledge zones 152 where the slot bottoms become slot sides. As a practical matter, such a change of divergence is made rather abrupt to lessen the tendency for the pin to snap up during closing. These slopes indicated can vary between the solid and the dashed lines but can not substantially block maneuvering channel 153 which is indicated as being within the dashed lines.

The opener-closer slot should have its sides substantially aligned with a vertical plane perpendicular to the base in order that the base not be subjected to forces tending to twist it about a vertical axis. However, the opener-closer slot can be skewed so that a bifurcating plane (a plane passing through the middle of the passageway formed by the opener-closer slot) is inclined from the vertical. A skewness in excess of about 35 degrees from the vertical will tend to result in lateral sliding of the device during opening or closing of pins.

The critical measurement of slot width is between the widest part of the ledge zones (narrowest part of the slot sides), a measurement hereafter called the ledge span. The ledge span chosen for a particular opener-closer slot must come within a certain range to work for a particular size of safety pin. For example, a standard No. 3 safety pin requires a ledge span of between 0.15" and 0.23" while a standard No. 2 safety pin requires a ledge span of between 0.11" and 0.19". Narrower ledge spans will catch the point guard of the safety pin so as to prevent direct removal of a pin from the bottom of the opener-closer slot. Wider ledge spans will not provide reliable opening of safety pins. The optimum width, which provides "cam action" for getting the desired result with the least force exerted by the operator, is the maximum width for the size pin used.

Working slot sides 151 extend above ledge zones 152 high enough to furnish a guiding surface for helping to close a safety pin. If the ledge zone is to be used to guide a safety pin bearing an optimum size relationship to it, working slot sides 150 must extend six and one-half times the ledge span above ledge zones 152.

Slot sides may continue upward above working slot sides 151 with or without increasing divergence as a guide for downward insertion of safety pins or as a border for maneuvering channel 153. If the ledge zone is to be used to guide a safety pin bearing an optimum size relationship to it, maneuvering channel 153 must extend at least eight times the ledge span above ledge zones 152.

The significance of having working slot sides 151 diverge no more than 20 degrees is indicated in Figs. 4 through 8. There one or another, or both of the shanks of a safety pin being opened or closed are riding along the working slot sides as a follower rides on a cam. Torque is being applied by the operator by pressing downward and laterally on the top shank and laterally at the bottom shank while the safety pin is gripped near the coil end. This causes the bottom shank to ride over the slot bottom to some place in the ledge zone where lateral movements of the bottom shank will virtually cease. Then the operator's force will twist the safety pin about the bottom shank as a pivot. During the process of closing a safety pin, the top shank rides down one working slot side into the ledge zone and then becomes the bottom shank about which further pivoting takes place.

If the two parts of the slot bottom has less divergence than 90 degrees from each other, the bottom shank can not be depended upon to slide laterally and what is the bottom of the slot becomes hard to delimit in terms of effect on safety pin movement. Hence, the bottoms of the slot sides are taken as reference planes. If the working slot sides have a divergence of greater than about 14 degrees from each other, the bottom shank of the safety pin is apt to snap upward prematurely during twisting and prevent the opening or closing desired. The limit is set at 20 degrees to take care of variations, but the theoretical limit is about 14 degrees. This limit is arrived at by considering the mechanical advantage or disadvantage involved in leverages and sliding over inclined surfaces during opening or closing of safety pins.

Twisting forces are efficiently applied from near the coil end of the pin because such forces are transmitted without loss of mechanical advantage to the pin shanks where they slide on the slot sides. On the other hand, since the fingers press near the coil end than do the slot sides there is about a 50 percent loss of mechanical advantage in applying pressure in the plane of pin-closing. As the pin shanks move toward each other spring tension increases but mechanical advantage of torque increases also due to the "cam" action, the upper pin shank riding on the slot side toward the ledge zone. The downward component of pressure on the shank need not be varied greatly from start to finish of pin opening or pin closing. The operator can use a fairly even application of force. With a divergence of greater than about 14 degrees, extra downward force is required to prevent the pin from snapping out of the slot. This means inefficient and uneven force and a more conscious effort in holding the pin in the slot.

Structure into which the slot is formed should not be thicker than will allow the safety pin to extend properly on each side. If the ledge zone is to be used to guide a safety pin bearing an optimum size relationship to it, the slot structure in the immediate vicinity of the slot should not be thicker than two ledge spans.

The working slot sides, the ledge zone, and the slot bottom should preferably have rounded or beveled edges so that point guard twisted on a safety pin will not catch during removal of the safety pin from the opener-closer slot.

The storage post can be generalized to the extent that its limits can be set. Even if made with tapered edges to prevent wedging, the storage post can be no wider than 5.7 ledge spans or no thicker than 1.1 ledge spans where the embodiment of my invention is used with a safety pin bearing an optimum size relationship to the ledge zone.

On at least one accessible side of the structure into which an opener-close slot is formed there should be a clear space above the base extending outward from the slot ledges and downward at no less than 35 degrees from the horizontal. This is necessary to allow room for the operator's hand to hold the safety pin near the slot and with sufficient orientation of the safety pin to prevent twisting of the base about a vertical axis during the opening or closing of the safety pin.

While I have shown and described particular embodiments herein, it is to be understood that they may be varied without departing from the spirit of my invention.

Having now described the invention, what I claim as new and desire to secure by Letters Patent is:

1. A safety pin storage device comprising a storage post adapted to receive thereon a plurality of closed safety pins and a latching mechanism disposed generally within the post for releasably retaining the safety pins against removal from the post, said storage post being hollow and having an opening in the top portion with opposite side openings beneath the top opening and inwardly projecting abutments in the lower portion of the hollow section below each side opening, said latching mechanism having a pair of catch elements adapted to extend respectively through the side openings, a release button portion positioned in the top opening, and spring portions separately connecting each catch element with the release button, a lower portion of each spring portion resting on one of said abutments within the storage post so that a downward pressure on the release button will produce an inwardly pivoting action of the spring portions, thereby causing each catch element to swing inwardly and allow removal of the safety pins carried on the post.

2. A safety pin storage device comprising a storage post adapted to receive thereon a plurality of closed safety pins and a latching mechanism disposed generally within the post for releasably retaining the safety pins against removal from the post, said storage post being hollow and having an opening in the top portion of the opposite side openings beneath the top opening and inwardly projecting abutments in the lower portion of the hollow section below each side opening, said latching mechanism having a pair of catch elements adapted to extend respectively through the side openings, a release button portion positioned in the top opening and a U-shaped portion connecting each catch element with the release button, the outward part of the closed end of each U-shaped portion resting on one of said abutments within the storage post, so that a downward pressure on the release button will cause the outer side of each U-shaped portion to pivot inwardly about the abutment thereby causing each catch element to swing inwardly and allow removal of the safety pins carried on the post.

3. A safety pin storage device comprising a base, a storage post extending upwardly from the base and adapted to receive thereon a plurality of closed safety pins, and a unitary latching mechanism disposed generally within the post for releasably retaining the safety pins against removal from the post, said storage post being hollow and having an opening in the topmost portion with opposite side openings beneath the top opening and inwardly projecting abutments in the lower portion of the hollow section below each side opening, said latching mechanism having a pair of catch elements adapted to extend respectively through the side openings, a release button portion slidably positioned in the top opening, and a U-shaped portion connecting each catch element with the release button, the outward part of the closed end of each U-shaped portion resting on one of said abutments within the storage post, the arm of each U-shaped portion connecting the closed end with the release button being resilient so that a downward pressure on the release button will cause the arm of each U-shaped portion connected to each catch to pivot inwardly about its abutment thereby causing each catch element to swing inwardly and allow removal of the safety pins carried on the post.

References Cited in the file of this patent

UNITED STATES PATENTS

| | | |
|---|---|---|
| 695,299 | Freeland | Mar. 11, 1902 |
| 863,254 | Bishop | Aug. 13, 1907 |
| 1,414,315 | Swanson | Apr. 25, 1922 |
| 1,636,558 | Hagel | July 19, 1927 |

FOREIGN PATENTS

| | | |
|---|---|---|
| 431,834 | France | Sept. 21, 1911 |